UNITED STATES PATENT OFFICE.

CARLETON ELLIS, OF MONTCLAIR, NEW JERSEY, ASSIGNOR TO NEW JERSEY TESTING LABORATORIES, A CORPORATION OF NEW JERSEY.

WATER-RESISTANT CEMENT AND PROCESS OF MAKING SAME.

1,076,028.     Specification of Letters Patent.     Patented Oct. 21, 1913.

No Drawing.     Application filed September 30, 1911. Serial No. 652,114.

*To all whom it may concern:*

Be it known that I, CARLETON ELLIS, a citizen of the United States, and a resident of Montclair, in the county of Essex and State of New Jersey, have invented certain new and useful Improvements in Water-Resistant Cements and Processes of Making Same, of which the following is a specification.

This invention relates to a water resistant cementitious composition and to the process of making same and relates in particular to Portland or other hydraulic cement compositions and to plaster mixtures of a water repellent character, especially when set or hardened, whereby the penetration of water through the hardened masses thereof is prevented, and to the process of making such compositions, capable after setting of effectually resisting the capillary ingress of moisture; all as more fully hereinafter described and as claimed.

Ordinary Portland cement concrete absorbs water readily after setting and hardening, which for many applications is a most disadvantageous feature, and the cure of which has been the subject of many proposals. The several methods of rendering concrete waterproof, so called, by the procedure of integral treatment as distinguished from superficial treatment, have mostly the common disadvantage of lack of permanency of the waterproofing agent. Water-insoluble mineral soaps have been used to some extent but these have the common weakness of ease of oxidation and decomposition. Aluminum palmitate, for example, when mixed with dry cement in the proportion of about $1\frac{1}{2}\%$ and this mixture incorporated with sand affords a concrete which when once dried repels water very well for a space of a year or so, depending on the local meteorological conditions. After a certain time however the salt decomposes, aluminum in some form separating from the palmitic acid and the latter becoming more or less oxidized to a more soluble and hence less water-resistant state. This appears to be characteristic of most of the soaps of the non-drying oils, and to a considerable degree of those of the drying and semi-drying oils. Low cost of manufacture is also an essential, as a material used in such great bulk as Portland cement necessarily calls for relatively slight waterproofing cost. This practically precludes the use of the soaps of the drying oils to any large extent.

The integral method of treatment referred to, consists in incorporating water-proofing material with the cement or concrete mixture, so that the water-proofing material is distributed more or less uniformly throughout the mass of the set concrete. Superficial water-proofing as its name indicates, consists in treating merely the surface of the concrete with some water-proofing agent.

To stop the ingress of water a concrete must have its voids or capillary water-channels lined with a water repellent material, from the standpoint of integral waterproofing. This calls for a material which will distribute itself throughout the concrete mass in particles of great fineness in order that the water-channels may have their surfaces properly coated with a sufficient quantity of water-repelling substance. Therefore a compound suited for this purpose should be one which is unaffected by cement-alkali or if acted on by alkalis it should not be detrimentally changed from the standpoint of water repulsion; it should not deteriorate on long exposure under extreme service conditions by oxidation or otherwise; and essentially it should be capable of extreme dissemination throughout the concrete mass, lining the voids and capillary channels with a surfacing of minute, uniformly distributed water-repellent particles. With a compound of this description it no longer becomes necessary to fill the voids with water-repulsive material as the forces of capillarity may be efficiently overcome, and much more cheaply, by such a channel lining.

I have found that unsaponifiable waxes, more particularly the mineral waxes such as paraffin and ceresin possess the desirable properties referred to above as regards inertness to cement-alkali and meteorological conditions and I have determined that such waxy bodies may be incorporated with Portland cement or similar hydraulic cement or plaster in such a manner that the final concrete product exhibits substantial freedom from capillary action so far as absorption of water is concerned.

Both paraffin and ceresin waxes are extremely stable bodies, resisting even the strongest reagents in a very marked manner, Sulfuric acid of a strength which would quickly destroy a waterproofing compound such as calcium stearate, for example, has, on paraffin wax practically no action. Incorporated in cement-concrete these waxes show very great stability while their waterproofing action depends on the degree with which the capillaries are lined with the particles of the waxy material.

The object of the present invention, in part, is the securance of such an extreme measure of distribution of these inert waterproofing agents that a relatively small quantity of the waxy material insures a large quantity of concrete from invasion by water.

This important condition I attain on the large scale by atomization of the wax with cement or other finely divided mineral material and the like. For example, the wax may be melted and atomized to form a cloud or mist of minute particles which are directed into the path of a stream of cement, on the particles of which the wax congeals to form a dual body, partly cementitious material and partly wax. As only a relatively small amount of wax suffices to secure the properties desired in the finished product, provided the distribution of the wax is effective, it is not necessary to saturate the cement particle with the waterproofing compound, but merely to attach to it a tiny water-repellent accretion; which serves the purpose quite as well and even better than were the case if the cement particle had been saturated with wax or sealed by it from access of water. Such a condition as last mentioned would cause the cement particles so saturated or sealed to be practically without setting qualities, and act substantially like an equivalent quantity of inert material from the standpoint of hydraulicity. It is not necessary, however, to treat the entire body of cement material with wax in this manner. If a portion of the cement, say one fourth or one third, is treated with wax properly and then mixed with the untreated cement, the whole body of the material acquires water repelling qualities. Similarly, inert material may be used as the wax carrier or distributer in place of cement. For example such fillers or carriers as finely ground talc, whiting, precipitated carbonate of lime, lime borax waste, alkali lime waste, oxid of magnesia, fullers' earth and infusorial earth, clay, silex, wood flour and the like may be quite heavily charged with wax and incorporated with cement or plaster to the extent of five or ten per cent. or so, or as required to meet the particular work in hand. Hydrated lime serves as a carrier when certain special consistencies or degrees of plasticity are required in the resulting mortar. Hydrated lime has some value in filling voids so that its use in this manner offers certain advantages. The wax may also be incorporated with the cement or a carrier of an inert character by means of solvents, which is not however a method that can be recommended for working on the large scale. It may be carried out in various ways but the following illustrative procedure will serve to indicate the general manner of treatment:—two parts of paraffin wax are dissolved in four parts of benzol, which may be done very readily by melting the wax and thinning with the benzol. While still warm ten parts of finely powdered asbestine (short fibered asbestos) are added and well incorporated to form a thick paste or putty. On removal of the solvent (which may be recovered) a lumpy material remains which may be ground without much difficulty, and sieved to the requisite degree of fineness. This fine material is then added to Portland cement or calcined gypsum and sand and aggregate incorporated. In the case of plaster, hair or wood fiber and the like may be introduced. In lieu of asbestine other mineral or organic carrier may be used in a like way or cement or calcined plaster directly employed, a procedure which does away with the introduction of inert material to act as a wax carrier, into the cementitious base.

Atomization of the wax enables large quantities of cement to be treated more readily and more cheaply. As stated, it is therefore the better method of procedure on the large scale. In order to secure the proper distribution of the wax a number of factors must needs be considered. First, there is the question of the temperature of the wax at the time of atomization; second, the temperature of the cement material or other wax carrier; third the temperature and pressure of the air or other atomizing fluid, if such be used in the operation. In attaching wax in a finely divided state to a mineral substance such as cement conditions may be instituted so that the wax congeals as it attaches to the carrier, or congelation may occur more or less before contact with the carrier, or the wax may be caused to penetrate to some extent into, or surface the carrier.

Just what form the material should take will depend on the application to which it is to be put. A stucco concrete should be treated differently from a cement used for instance in forming the walls of a swimming pool. A concrete resisting external water pressure may have a different composition from one resisting an internal water pressure.

Forms of water-repellent cement suited for different conditions may be derived by an observance of conditions above mentioned, which will be hereinafter discussed in greater detail.

To secure congelation of the wax at the time it attaches to the carrier the latter may be passed through the zone or jet of atomized wax, without preheating; so that immediately the liquid molten wax particles strike particles of cold finely divided cement or other carrier congelation occurs and solidification takes place so quickly that there is little opportunity for further increase in the size of the particle. If the wax remains in a fluid state for some time after contacting with the cement, agglutinization takes place, the cement particles binding together to form a granular mass which requires considerable grinding to restore it to its original degree of comminution. Such agglutinization may occur when cement, hot from the clinker grinding mills, is brought in contact with the wax. If the latter is heated to a temperature considerably above the melting point, so as to be in a supermolten condition, and the hot cement then incorporated, a very thorough distribution may be secured, but there is a tendency to lumpiness, which however may be corrected by cooling and subjecting to mild grinding. Heated air or other heated fluid for atomization also secures more uniform distribution of the wax upon the carrier. Compressed air chills the wax quickly owing to the absorption of heat during expansion. If heated to a temperature of 200° C. or so prior to expansion the drop in temperature is considerable, on expansion, but not sufficient to cause congelation of the wax. Cold compressed air, cold cement and wax at a temperature only slightly above the melting point tend to the formation of unattached wax particles, or particles having only a weak bond with the cement. As the distribution of free (unattached) wax particles throughout a mass of cement-concrete does not give results as useful as is the case when the wax is attached to a heavy carrier, such as cement, I prefer to conduct the operation of the present process in such a manner that the finely-divided wax attaches itself firmly to the particles of carrier, but not under such conditions of temperature, etc., that the particles of carrier become sealed or clumped into masses of large size, bound together by congealed wax. Inasmuch as the special or preferred product of the present invention is a pulverulent cement having attached particles of wax well distributed through its mass, which pulverulent cement may be handled and stored in the dry form without deterioration, and which on the addition of sand or aggregate becomes a concrete base, capable of setting when moistened, at about the same rate as normal cement, it follows that the process should be preferably conducted with this end in view, and the variables—temperature of wax, cement and atomizing air—adjusted in accordance with the character of the product required. For general purposes the addition of 1–3% of wax to Portland cement is usually sufficient. This may be incorporated in or with the cement under various conditions, *e. g.* the cement may be used hot, with cold compressed air and wax at about 40° C. above the melting point; or the cement may be cold, the compressed air heated to 200° C. and the wax in the melting kettle maintained at about 50° C. above the melting point; or the cement may be cold and the wax atomized without the use of any air disintegrating jet, instead two or more jets of wax under pressure being directed into mutual impingement so as to self-atomize and thus eliminate the air jet. Then too the melting and solidifying point may be modified by the addition of thinning materials, such as residuums, naphthenates, oils and petroleum jelly and greases. Hardening materials may also be introduced as for example the softer forms of paraffin wax such for example as scale wax, may be hardened by means of asphalt, pitch, gilsonite, resins as Pontianak rubber resin, metallic soaps as zinc stearate or magnesium palmitate, and other similar materials. It should be added that such water-insoluble soaps are less susceptible to deterioration when dissolved in or embedded in a mass of unsaponifiable substance like paraffin wax. The latter wax has been mentioned particularly in the foregoing because it is especially adapted for this application, but it should be understood that various waxes of differing chemical constitution may also be used in the manner set forth herein. Tetrachlornaphthalene and other chlorinated compounds of naphthalene of a similar character serve especially well for treatment of cement which is to be used in making concrete tanks capable of resisting the action of acids. A tank made with such cement and then coated with a finish consisting of a solution of chlornaphthalene (waxy) and Pontianak rubber resin will resist the action of aqueous acids for an indefinite time.

By the present invention white Portland cement may be as effectively treated as ordinary Portland cement. Hydrated lime plasters or ordinary lime plaster or plasters containing calcium aluminate, bauxite or other alumina compound conferring special setting or bonding properties on the composition may also be waterproofed in accordance with the present invention. Plasters containing considerable proportions of hydrated lime or other calcareous materials reacting with ordinary water-soluble soaps to form water-insoluble soaps may be caused to carry the former type of soap in a dry finely divided form until water is added, when a lime soap forms and is precipitated throughout the wet plaster mass. On drying the water-insoluble soap, so formed, renders the mass resistant to the capillary ingress of moisture; but the resistance afforded diminishes with time and the incorporation of finely-divided wax, preferably attached to a heavy carrier, tends to preserve the lime soap from destruction by oxidizing influences. A portion of the sand employed in such mixtures customarily, may be waxed. This is not desirable except under certain conditions. Neither is it always feasible to treat sand in this way because of practical mechanical hindrances. One method of incorporation has the advantage of specially good waterproofing qualities without loss of strength. It is that of forming a mixture of cement, for example, and sand or gravel of fairly uniform size, and introducing into this a mixture of waxed void-filling sand grains of various sizes, so that the voids are filled with waxed sand. Thus the voids are filled with what to all intents and purposes are granules of wax, while the bonding strength is substantially unimpaired.

For a number of important applications Portland cement may be treated with a spray-mist of wax carrying a fatty acid, such for example as stearic, palmitic, oleic, or naphthenic acids. A mixture of stearic, palmitic and oleic acids known as still stock is useful. Arachidic acid and the fatty acids of cotton seed oil may also be employed. Distilled fatty acids, especially the harder sorts containing some hydrocarbon oil or wax-like bodies may be used in some instances. Degras or wool-grease, crude or refined, affords a cheap base, also the resin acids such as abietic acid. While such acids may alone be incorporated with the cement without the addition of unsaponifiable wax, I prefer to use these acid compounds in conjunction with an amount of wax varying with the special application of the cement. As stated fatty acid soaps and the like tend to hydrolyze or decompose in the cement after a time under severe service conditions and the presence of the wax seems to act in an inhibitory way as regards such decomposition, aside from the waterproofing effect derived from the presence of such wax. The waxy body may therefore be used in such cases as an inhibitor of decomposition.

After admixture with the cement but more particularly after water has been added to the cement to cause it to set, the acid bodies present enter into combination with the ingredients of the cement forming peculiar complexes as it were, whereby special waterproofing effects are secured. The acids seemingly attach to or combine with the hydraulic components of the cement to build up complexes of importance from the waterproofing standpoint. Whereas when cement clinker is ground with fatty acids or soaps of a reactive character combination takes place in the cement before the addition of water and in the case of additions of calcium stearate, for example, to cement before the addition of water, there is no reaction, the case is different with the atomized fatty or similar acid especially when stabilized by a waxy component. Under these circumstances the formation of complexes takes place after the addition of water to the cement or concrete and these occurrences are of import in the prevention of segregation as well as useful in permitting the water to be thoroughly and easily incorporated with the cement material. Cement waterproofed with a pre-formed lime soap for example does not take up water readily and segregation is liable to occur. The product of the present invention may be so proportioned that water may be readily added and incorporated while segregation is substantially excluded.

Illustrative examples of treated cement of this character are as follows;—15 lbs. of scale wax, 20 lbs. of colophony and 18 lbs. of stearic acid are melted and heated to about 115° C. This is atomized into 1 ton of cold, ground, Portland cement using for atomizing purposes heated compressed air to form a mist spray of extremely high comminution. The cement is then ready to be packaged for shipment. The cement should of course be passed through the spray-mist in a uniform manner, if uniform distribution of the waterproofing agent is desired. Similarly a mixture of equal parts of still stock and naphthenic acid may be employed in about the same proportions, or equal parts of colophony, paraffin wax, and the distilled oils, containing fatty acids, which are derived from the waste soaps and greases of textile mills.

What I claim is;—

1. The process of making water-resistant mineral material capable of bonding on exposure, which comprises passing finely-divided dry mineral material capable of bonding on exposure, through a spray zone of a waterproofing body.

2. The process of making water-resistant mineral material capable of bonding on exposure which comprises passing finely-divided dry mineral material capable of bonding on exposure through a spray zone of a waterproofing body in a molten condition.

3. The process of making a water-resistant cement which comprises passing dry ground cement through a spray zone of a normally-solid organic waterproofing body in a substantially molten state.

4. The process of making a water-resistant cement which comprises maintaining in a molten state a waterproofing body containing a fatty acid, in atomizing said body to form a spray zone, and in passing cement through said zone, whereby said cement is uniformly commingled with said waterproofing body.

5. The process of making a water-resistant cement which comprises maintaining in a molten state a waterproofing body containing a fatty acid and a wax, in atomizing said body to form a spray zone, and in passing cementitious material through said zone.

6. The process of making a water-resistant cementitious material which comprises atomizing a substantially water-insoluble substantially anhydrous organic acid and a waxy body, in passing dry, finely-divided, cementitious material through the zone of atomization, and in collecting the product.

7. The process of making a water-resistant cementitious material which comprises atomizing an anhydrous, normally solid, water-insoluble waterproofing body containing stearic acid, in passing dry, finely-divided cementitious material through the zone of atomization, and in collecting the product.

8. As a new article of manufacture, a cementitious material capable of becoming water-resistant after setting and drying, which comprises a mineral cement and a thereto attached but substantially uncombined fatty acid.

9. As a new article of manufacture, a cementitious material capable of becoming water-resistant after setting and drying, which comprises a dry, finely-divided mineral cement and a thereto attached but substantially uncombined fatty acid capable of slow combination on the addition of water.

10. As a new article of manufacture, a hydraulic cement capable of becoming water-resistant after setting and drying, which comprises a dry, finely-divided mineral cement and a modicum of a substantially water-insoluble substantially anhydrous organic acid.

11. As a new article of manufacture, a hydraulic cement capable of becoming water-resistant after setting and drying, which comprises a dry, finely-divided mineral cement, and a modicum of an uniformly distributed waterproofing mixture carrying a fatty acid, a resin acid and a waxy stabilizer and inhibitor of decomposition.

12. As a new article of manufacture, a water-resistant cement comprising hydraulic cement and uniformly incorporated atomized fatty acids and wax.

13. As a new article of manufacture, a dry, pulverulent cement having atomized wax and atomized fatty acid attached to its particles.

14. As a new article of manufacture, a dry pulverulent cement having atomized wax, atomized fatty acid, and atomized resin acid attached to its particles, but substantially chemically uncombined therewith.

15. As a new article of manufacture, dry, ground, Portland cement having atomized wax, atomized fatty acid, and atomized resin acid attached to its particles, substantially chemically uncombined therewith, but capable of combination to form water-resistant complexes while said cement is caused to set in the presence of water.

Signed at Montclair in the county of Essex and State of New Jersey this 29th day of Sept. A. D. 1911.

CARLETON ELLIS.

Witnesses:
CHARLES WRIGHT,
NATHANIEL L. FOSTER.

Copies of this patent may be obtained for five cents each, by addressing the "Commissioner of Patents, Washington, D. C."